P. F. KING.
Time Lock.

No. 201,535.  Patented March 19, 1878.

2 Sheets—Sheet 1.

ATTEST:
Chas Hall
Chas J Gooch

INVENTOR:
Phineas F. King
By Knight Bros.
Attys.

2 Sheets—Sheet 2.

P. F. KING.
Time Lock.

No. 201,535. Patented March 19, 1878.

ATTEST:
Chas Hall
Chas J. Gooch

INVENTOR:
Phineas F. King
By Knight Bros.
Attys.

UNITED STATES PATENT OFFICE.

PHINEAS F. KING, OF ST. LOUIS, MISSOURI, ASSIGNOR TO BEARD & BROTHER, OF SAME PLACE.

IMPROVEMENT IN TIME-LOCKS.

Specification forming part of Letters Patent No. 201,535, dated March 19, 1878; application filed September 10, 1877.

*To all whom it may concern:*

Be it known that I, PHINEAS F. KING, of the city of St. Louis, in the State of Missouri, have invented certain new and useful Improvements in Time-Locks, of which the following is a full, clear, and exact description, reference being had to the accompanying drawings, forming part of this specification.

This is an improvement in that class of time-locks for safes and vaults which are arranged to allow the free movement of the bolt-work of the safe for a period, and then to prevent any movement of the bolt-work for another period.

My improvement consists, first, in combining, with indicator-hands, safety-wheel, and drop-latch, an unlocking-lever provided with an adjustable plate, and a pawl engaging with teeth on said wheel, which is constructed with cams adapted to retain the parts in unlocked position.

My improvement consists, further, in combining, with indicator-hands and forty-eight-hour wheel, an adjustable plate or slide attached to the unlocking-lever.

My improvement consists, further, in a forty-eight-hour gear-wheel, provided with hands adapted to operate alternately on the lever, to unlock every twenty-four hours, said hands being adjustable in such a manner that when they are placed together the lock will run forty-eight hours, or over one day, without unlocking.

My improvement consists, further, in combining, with the unlocking-lever and pawl, a safety-wheel constructed with teeth and cams, as hereinafter set forth.

My improvement consists, further, in combining, with the unlocking-lever and gear-wheel, revolving once in twenty-four hours, two adjustable hands, two pointers, and a double twenty-four-hour indicator.

Figure 1:
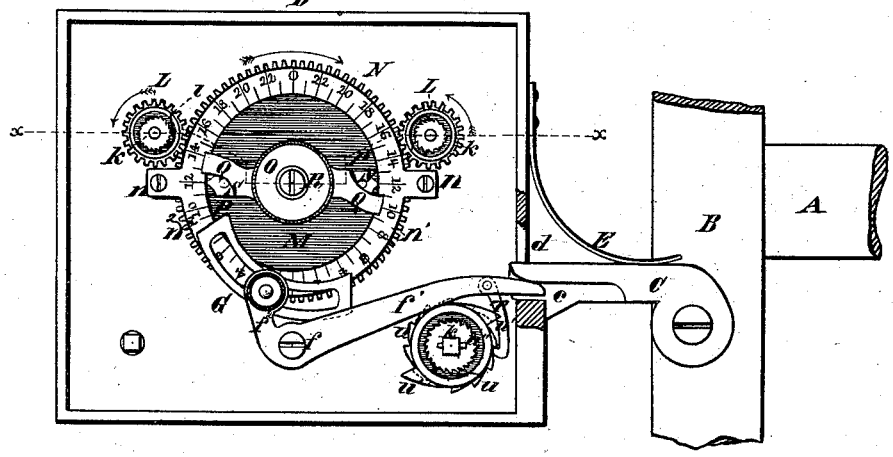
Figure 2:
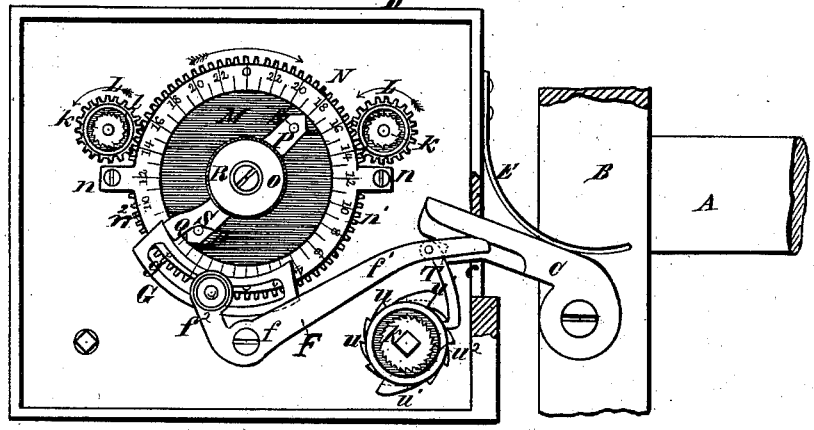
Figure 3:
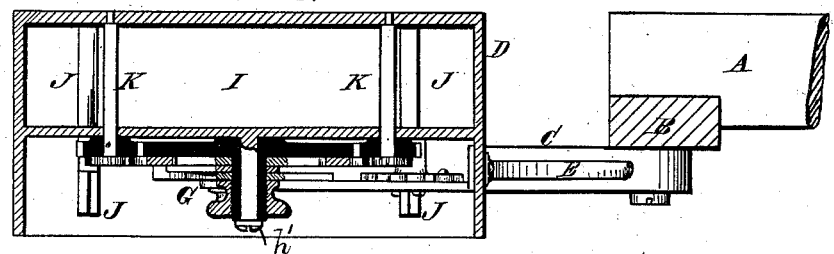
Figure 4:
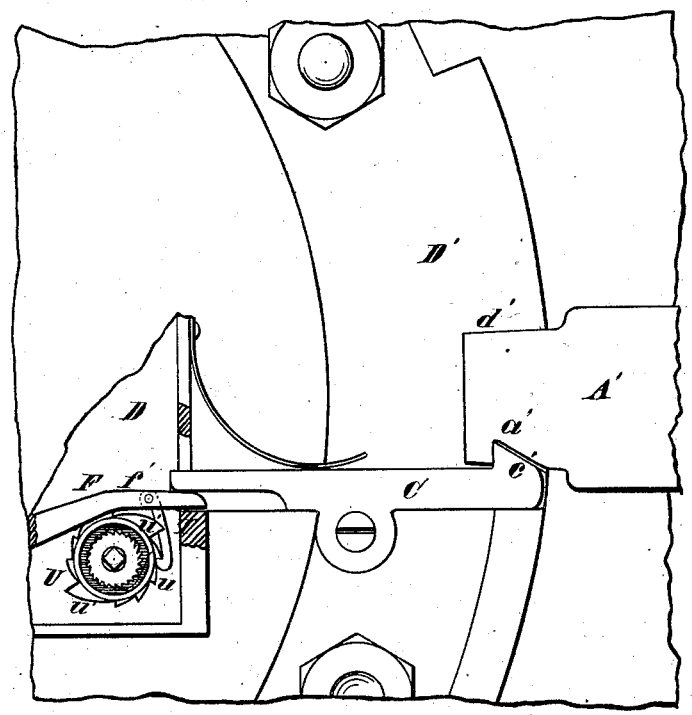
Figure 5:
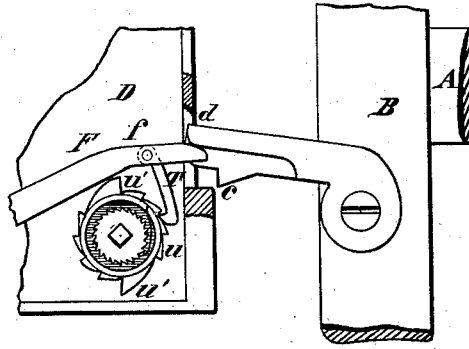
Figure 6:
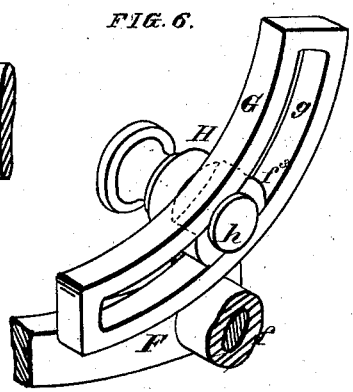

In the accompanying drawings, Figure 1 is an inner side view, showing the door locked. Fig. 2 is a similar view unlocked. Fig. 3 is a section thereof on the line $x\,x$, Fig. 1. Fig. 4 is a side view, showing the application to a round (screw) door. Fig. 5 is a detail of winding-movement, showing the device to retain the parts in unlocked position if the time-movements are allowed to run down. Fig. 6 is a detail perspective view, showing the inside of the lifting-lever.

A A is the bolt-work of the safe or vault door, said bolt-work being moved with the usual knob and spindle; and the bolt-work may be retained in a locked condition by another lock in addition to the time-lock; but I shall not show or describe these parts, because no novelty is claimed in them. B is the train-bar, which is attached to, or forms part of, the bolt-work of the door. C is the drop-latch, pivoted to the train-bar, and its end projecting through an aperture, $d$, in the case D. E is a spring resting on the latch C, and tending to hold it in its locking position, so that in case the safe might be inverted the latch would remain in said position, and prevent the bolts from being unlocked except at the proper time.

At the under side of the latch C is a catch, $c$, which, when the latch is in the locked position, (shown in Fig. 1,) engages against the case of the lock, and prevents the bolt-works from retracting, (to unlock the door.)

F is the lifting-lever, fulcrumed at $f$, and its longer end, $f^1$, passing through the aperture $d$ in the case, and under the ends of the latch C. The shorter end, $f^2$, turns upward, and has upon the inner side a segmental block, $f^3$, as shown in Fig. 6, forming the guide to the adjustable segment G. The block $f^3$ fits in the curved slot $g$, the construction being such that the segment G can be adjusted endwise upon the guide-block $f^3$. H is a screw-pin passing through the guide-block $f^3$, and whose head $h$ engages against the inner side of the adjustable lifting-segment G, so that by the screwing up of the set-nut $h'$ upon the screw H the lifting-segment is fixed in place.

I is the case containing the time-movements. I claim no novelty in these, as I use those of ordinary construction, and it will not be necessary to give any description of them except to indicate the winding-shafts, and the shafts carrying the pinions by which rotation is communicated to the intermediate wheel M. J are the winding-shafts, and K the shafts of the driving-pinions L, which pinions have free forward rotation on the shafts, but each is impelled with its shaft in forward rotation by a ratchet-wheel, $k$, on the shaft, and pawl $l$ on the pinion. The purpose of having two separate time-movements is to insure that there shall be no stoppage from the stoppage of a movement, (which is liable to occur from the clogging or breakage of some part,) and the purpose of the ratchet-connection $k$ $l$ is to insure that one set of time-movements shall not be a clog upon the other, either when stopped or when running at slower speed. The movement that runs the faster impels the intermediate wheel M, and upon any impediment slowing the motion of this movement the other time-movement comes to its assistance. Each shaft K has a single rotation in twelve hours, and as the intermediate cog-wheel M has a diameter four times as great as the pinion L, the intermediate cog-wheel will complete its rotation in forty-eight hours. In front of the intermediate wheel is the annular indicator-plate N, which is attached to the case by lugs $n$. The indicator has two sets of figures, $n^1$ and $n^2$, on the opposite sides of the face, both commencing at the same mark, 0, at bottom, and culminating in the figure 0 at top, and each being regularly numbered from the bottom to the top, as shown.

The intermediate wheel turns on an arbor, O. P are pointers fixed to the intermediate wheel. Outside the pointers are two wipers, Q, which have rotary adjustment on the arbor O, and are held in place therein by a set-nut, R. S are pins projecting from the pointers, and serving to carry forward the wipers Q with the intermediate wheel. As the wipers are carried around they come in contact with the upper edge of the segmental lifting-plate G, and as the pointer beneath said wiper reaches the figure 0, the wiper has just depressed the shorter end $f^2$ of the lifting-lever sufficiently to raise the catch $c$ out of engagement with the case D, and allow the retraction of the bolt-work. The semicircular arc of figures $n^1$ of the indicator are used to adjust the pointer so that the lock will open a certain time after it has been set, each figure indicating one hour. For instance, if it is six o'clock in the evening, and it is desired that the lock shall open at six next morning, one of the pointers is turned to figure 12 on the scale $n^1$, and then in twelve hours from that time the pointer will arrive at 0, at the bottom of the scale, and the wiper Q, by pressure upon segment G, opens the lock, as before described.

The scale $n^2$ is used to indicate the length of time the lock remains in unlocked position by the position of the upper end of the segment G, upon which the wiper operates. For instance, if the upper end of the segment is even with the figure 10, the wiper will pass that end in ten hours after it has passed the figure 0, (when the lock was first unlocked,) and the long end $f^1$ of the lifting-lever F will descend, allowing the latch C to fall, and as the bolt-works are moved into the locking position the catch $c$ engages the case, and the bolts are locked in position until the other pointer reaches the figure 0, just twenty-four hours after the lock was previously unlocked, when it will be again unlocked by the wiper at such pointer. When Sunday intervenes, the two wipers are placed together, as shown in Fig. 2, so that the wheel M has a whole rotation between the times of unlocking, and consequently the period between such times is forty-eight hours. To allow the adjustment of the wipers the nut R is loosened.

T is a draw-pawl hanging from a pivot on the longer end $f^1$ of the lever F. This pawl engages with ratchet-teeth $u$ upon a wheel, U, turning forward loosely on the shaft K, the arrangement being such that with each ascent of the lever F the wheel will have a partial rotation, and when the lever has risen the fourth time a larger tooth or cam, $u^1$, is brought beneath the longer end of the lever F, and prevents its descent, so that the lock remains open at the end of each fourth day from the time of winding, and there is no danger of the time-movements running down and leaving the safe locked, as it would at no time run more than four days without taking this fixed unlocked position. The wheel U has pawl-and-ratchet connection $u^2 k$ with the shaft K, preventing the backward rotation of the wheel.

When the longer end of the lever F is lifted by the tooth $u^1$, the pawl T is thrown out of engagement with the ratchet-teeth $u$, so that the time-lock must remain in unlocked condition until the ratchet-wheel is turned around to remove the tooth $u^1$ from beneath the lever. This rotation of the ratchet-wheel U is accomplished in winding up the clock-movement, as the ratchet-wheel $k$ upon the shaft has a pawl-connection, $u^2$, with the wheel U.

In Fig. 4 is shown a modification of my improvement as applied to the description of safe-doors in patent granted on my application filed April 6, 1874, and issued July 21, 1874, No. 153,348, reissued July 14, 1877. This door is made to screw in, and is prevented from unscrewing by a bolt, A', entering its periphery from the walls of the safe. This bolt is worked by devices outside the door to lock or unlock the door; but its retraction is prevented, during the time the safe should remain closed, by a catch, $c'$, upon the latch C, which takes into an angular notch, $a'$, of the bolt A' when the bolt is engaged in the recess $d'$ of the door D', and the time-lock mechanism is in its locked condition.

The time-lock is similar in its operation to that described, except for the slight modification of the latch, said latch being extended outward from the pivot, and having upon the upper end of the extension the ratchet-shaped catch $c'$, as described and shown, to engage the bolt.

The shape of the catch $c'$ is such that the bolt can enter the recess to lock the door at any time the door is closed, whatever the position of the time-lock may be, as when the time-lock is in the locked condition the entering bolt would lift the latch in entering the recess. It will be seen that the lifting of the longer end $f^1$ of the lever F will unlock the bolt.

I claim as my invention—

1. The unlocking-lever F, provided with an adjustable plate, G, and pawl T, in combination with the hands Q, safety-wheel U, and drop-latch C.

2. The adjustable plate or slide G, attached to the unlocking-lever F, in combination with the hands Q Q and forty-eight-hour wheel M.

3. A forty-eight-hour gear-wheel, M, with hands Q, operating alternately on the lever F, to unlock every twenty-four hours, said hands being adjustable in such manner that when they are placed together the lock will run forty-eight hours, or over one day, without unlocking.

4. The safety-wheel U, having ratchet-teeth $u$ and cams or arms $u^1$, in combination with the unlocking-lever F and pawl T, substantially as and for the purpose set forth.

5. The two adjustable hands Q, two pointers, P, and double twenty-four-hour indicator N, in combination with the unlocking-lever F and gear-wheel M, revolving once in forty-eight hours, and one or more clock-movements, for the purpose set forth.

PHINEAS F. KING.

In presence of—
  SAML. KNIGHT,
  CHAS. HALL.